US009262668B2

(12) United States Patent
Bedros et al.

(10) Patent No.: US 9,262,668 B2
(45) Date of Patent: Feb. 16, 2016

(54) DISTANT FACE RECOGNITION SYSTEM

(75) Inventors: Saad J. Bedros, West St. Paul, MN (US); Ben Miller, Minneapolis, MN (US); Michael Janssen, Minneapolis, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1071 days.

(21) Appl. No.: 12/785,318

(22) Filed: May 21, 2010

(65) Prior Publication Data

US 2011/0285845 A1 Nov. 24, 2011

(51) Int. Cl.
*H04N 7/18* (2006.01)
*G06K 9/00* (2006.01)

(52) U.S. Cl.
CPC ........ *G06K 9/00221* (2013.01); *G06K 9/00255* (2013.01); *G06K 9/00261* (2013.01); *G06K 9/00295* (2013.01); *G06K 9/00302* (2013.01)

(58) Field of Classification Search
CPC .......... G06K 9/00248; G06K 9/00604; G06K 9/00221; G06K 9/00261; G06K 9/00295; G06K 9/00302
USPC .......................................... 348/143; 382/103
See application file for complete search history.

(56) References Cited

U.S. PATENT DOCUMENTS

| | | |
|---|---|---|
| 6,215,519 B1 | 4/2001 | Nayar et al. |
| 6,744,463 B2 | 6/2004 | Rye et al. ...................... 348/159 |
| 2007/0019943 A1* | 1/2007 | Sueyoshi et al. .............. 396/287 |
| 2007/0211914 A1* | 9/2007 | Buehler ........................ 382/100 |
| 2008/0075334 A1* | 3/2008 | Determan et al. ............. 382/117 |
| 2010/0026810 A1* | 2/2010 | Kajita et al. .................. 348/159 |

FOREIGN PATENT DOCUMENTS

WO WO 2007/047719 A2 4/2007

OTHER PUBLICATIONS

GB Search Report GB Application GB1104551.5 dated May 27, 2011.

* cited by examiner

*Primary Examiner* — Emmanuel L Moise
*Assistant Examiner* — Xiang Yu
(74) *Attorney, Agent, or Firm* — Kermit D. Lopez; Luis M. Ortiz; Kevin Soules

(57) ABSTRACT

A method and system for automatic face recognition. A primary and a plurality of secondary video cameras can be provided to monitor a detection area. The primary video camera can detect people present in the detection zone. Data can be then transmitted to a prioritizor module that produces a prioritized list of detected people. The plurality of secondary video cameras then captures a high-resolution image of the faces of the people present in the detection area according to the prioritized list provided by the prioritizor module. The high-resolution images can be then provided to a face recognition module, which is used to identify the people present in the detection area.

17 Claims, 3 Drawing Sheets

DISTANT FACE RECOGNITION SYSTEM

GOVERNMENT RIGHTS

The United States Government has rights in this patent application pursuant to Contract No. N65236-02-D-7839.

TECHNICAL FIELD

Embodiments are generally related to video recognition devices and systems such as video cameras equipped with face recognition capabilities. Embodiments also relate to the identification of persons in a given scene.

BACKGROUND OF THE INVENTION

Typical security systems utilize a single video or still camera to identify subjects in a given area. However, these systems generally are limited in two ways. First, video camera's used in surveillance applications are generally not configured to monitor a wide area. Additionally, it is difficult to focus a single surveillance camera on a target when that target is far away, moving, or both. Thus, a single surveillance camera system is not well equipped to monitor a wide area for any present faces and capture the image of the face with enough resolution and contrast so that the face can be identified.

As such there is a need for an improved method and system for monitoring a wide area for the presence of people and then identifying the subject via face recognition technology.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide an improved video surveillance device.

It is another aspect of the disclosed embodiments to provide a system and method for providing improved video monitoring of a given area.

It is yet another aspect of the disclose embodiments to provide a system and method for improved video identification of the people present in a target area.

The aforementioned aspects and other objectives and advantages can now be achieved as described herein. A method and system is disclosed for automatic face recognition of individuals present in a detection area. A primary camera is configured to monitor the detection area. The primary camera detects the presence of people in the detection area. The detected people are then listed and prioritized via a prioritizor module. A plurality of secondary cameras, operating simultaneously or in series, then capture high resolution images of the faces of the identified people present in the detection area according to the prioritized list. A controller associated with the prioritizor module may control the plurality of secondary cameras. A face recognition module then determines the identity of each person based on the high-resolution image of his or her face provided by the plurality of secondary cameras.

The primary camera may be configured as a wide-angle camera. The plurality of secondary cameras may be configured as, for example, a high-resolution, pan, tilt, zoom (PTZ) camera. The plurality of secondary cameras may also be configured with an optical zoom to allow for enhanced high-resolution imaging.

The detection area may include any open or enclosed area where monitoring is desired. These areas may include large indoor or outdoor facilities, transportation centers, prisons, and hallways.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Some of the embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus (e.g., a computer system and video camera), those skilled in the art will appreciate that the mechanisms of the embodiments are capable of being distributed as a program product in a variety of forms.

Figure 1:
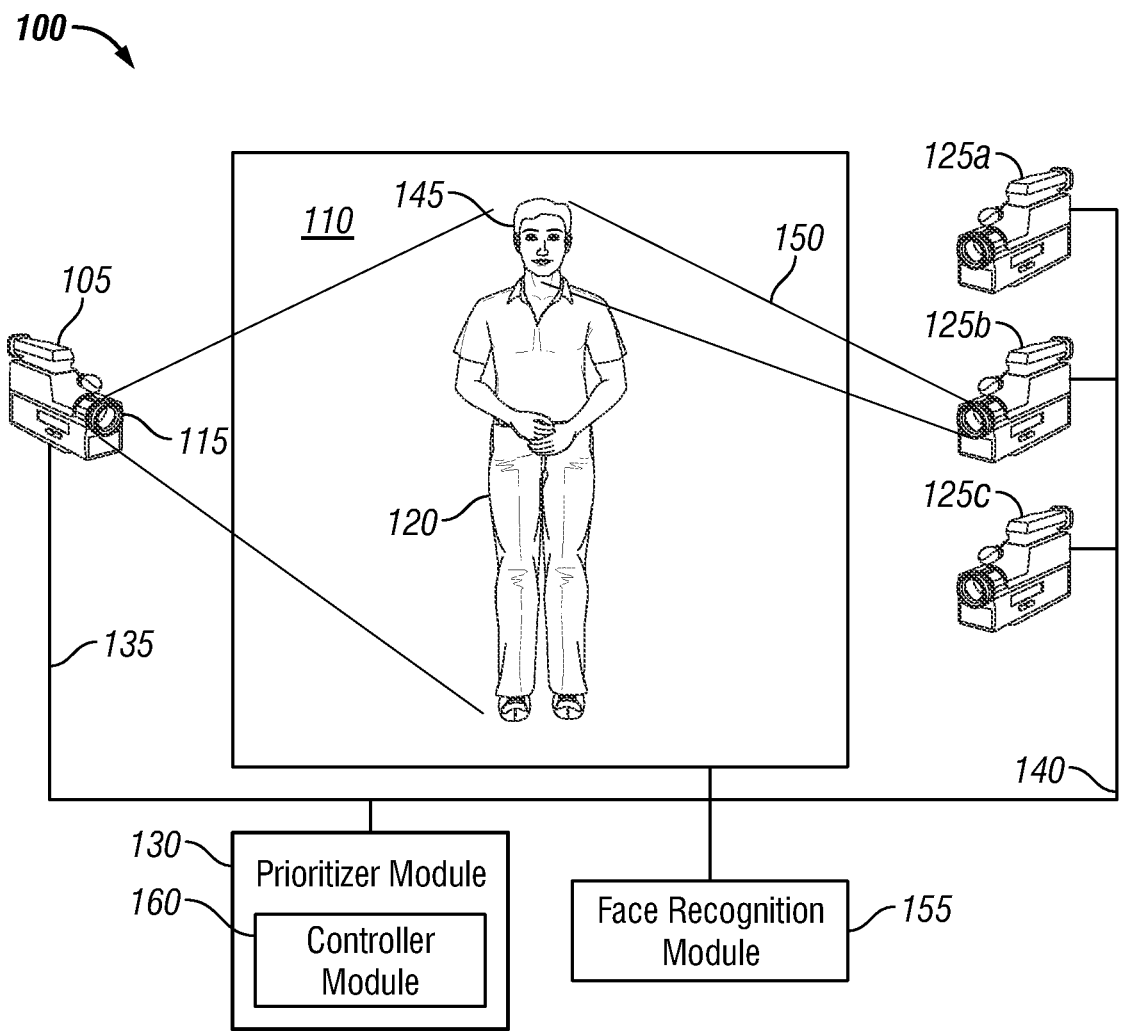
FIG. 1 illustrates a system for automatic face recognition, in accordance with a preferred embodiment.

Referring to the drawings and in particular to FIG. 1, there is depicted a system 100 for automatic face recognition in accordance with a preferred embodiment. As shown in FIG. 1, a primary video camera 105 can be configured to monitor a detection area 110. In an alternative embodiment (not shown) multiple cameras may serve as primary video cameras. Primary video camera 105 is preferably equipped with a wide-angle capability via wide-angle lens 115. A wide-angle lens typically describes a lens that projects a larger image field than a standard lens of the same focal length. Thus, a wide-angle lens offers the advantage of providing an extended field of view, which is of particular utility in the present invention. The wide field of view allows for monitoring of a large detection area 110 without the need for additional scanning of the detection area 110. However, depending on the specific size, shape, and environment associated with the detection area 110, additional scanning may still be necessary. For this reason primary camera 105 may be equipped with a digital pan, tilt, and zoom capability to allow for scanning of a detection area if necessary. Wide-angle lenses may result in perspective distortion and a blurred background because of an associated depth of field. However, these limitations will not affect the performance of the primary camera 105 as it is intended generally to detect and track people 120 in the detection area 110.

Detection area 110 may be any area wherein the detection of people is necessary. This may be, for example, within a public park, zoo, or other outdoor facility where general surveillance may be needed. Additionally detection area 110 may include an indoor facility where face detection capabilities may be needed. Such facilitates may include transportation facilities, sports arenas, prison, private residence, or other such enclosed spaces. The automatic face recognition system 100 may be particularly useful in large areas or in long thin areas such as hallways where high pedestrian traffic is common. The digital pan, tilt, and zoom capability may be of particular use in such areas where an individual walking past the primary camera 105 can create a large angle change in location over a relatively short time.

The data collected by the primary camera 105 is provided to a prioritizor module 130 via transmission line 135. In another example preferred embodiment, the communication between the primary camera 105 and the prioritizor module 130 can be achieved through a wireless transmission. Prioritizor module 130 utilizes the data provided by the primary camera 105 to compile and prioritize a ranked list of detected people within the detection area 110.

The prioritization is determined according to a predefined set of criteria that may be defined during the initialization of the system 100. The prioritization may, for, example be based on proximity to an exit or number of people within a given area. These and other such factors are generally considered scene information. Prioritizor module 130 then provides control commands to secondary cameras 125 a-c.

In an alternative example embodiment, the prioritization may be made according to overall scene information obtained by the primary camera 105 and target information obtained from the secondary cameras 125 a-c. In addition, the prioritizor module can use the overall scene information and target information to determine if tracking should continue or be interrupted.

The control commands may alternatively come from a controller module 160 associated with said prioritizor module 130 and transmission line 140. In an alternative embodiment the communication between prioritizor module 130 and secondary cameras 125 a-c is achieved through a wireless transmission. The controller module 160 can be configured to provide face detection, face tracking, and determine facial quality.

The prioritizor module 130 may also include the ability to minimize predicted error of the pan, tilt, and zoom of the secondary cameras 125 a-c, or alternatively the primary camera 105. The predicted error of the pan and tilt of a camera is measured based on a centering of the face 145 in the high-resolution image. The zoom error can be measured based on the relative face 145 size in the high-resolution image.

The automatic face recognition system 100 further includes a plurality of secondary cameras 125a, 125b, and 125c. Secondary video cameras 125 a-c may preferably be configured as pan, tilt, and zoom cameras and may further be equipped with a high-resolution capability. The high resolution capability may be accompanied by a zooming capability 150 which allows said secondary cameras to capture a high resolution image of a particular face 145 offering an image with a high resolution and contrast. The pan, tilt, and zoom capability of the secondary cameras allow the cameras to follow a target moving through the scene and still collect a high quality facial image. The plurality of secondary video cameras 125 a-c, are used to capture the individual faces 145 of all of the people 120 present in the detection area 110, as identified by the primary camera 105 according to the prioritized list provided by the prioritizor module 130. In an alternative example embodiment, the primary camera 105 may also be configured to capture the individual faces 145 of individuals 120 present in the detection area 110.

Data from the plurality of secondary cameras 125 a-c is then provided via transmission cable 140 to a face recognition module 155. In an alternative embodiment, the data transmission between secondary cameras 125 a-c and face recognition module 155 can be achieved via wireless transmission. A typical facial recognition system uses a facial recognition algorithm to identify a face by matching features of the captured image with other images with matching features. Such algorithms are generally characterized as either geometric or photometric. Geometric algorithms utilize the geometric properties of the captured image as compared to other images. A photometric approach is characterized by a decomposition of the image into a set of values that can be compared with a similar statistical rendering of the other source images. One skilled in the art will appreciate that any known method of facial recognition may be used by said face recognition module 155. One skilled in the art will also appreciate that the high-resolution image provided by the secondary video cameras 125 a-c will greatly improve the accuracy of the aforementioned face recognition methods.

Figure 2:
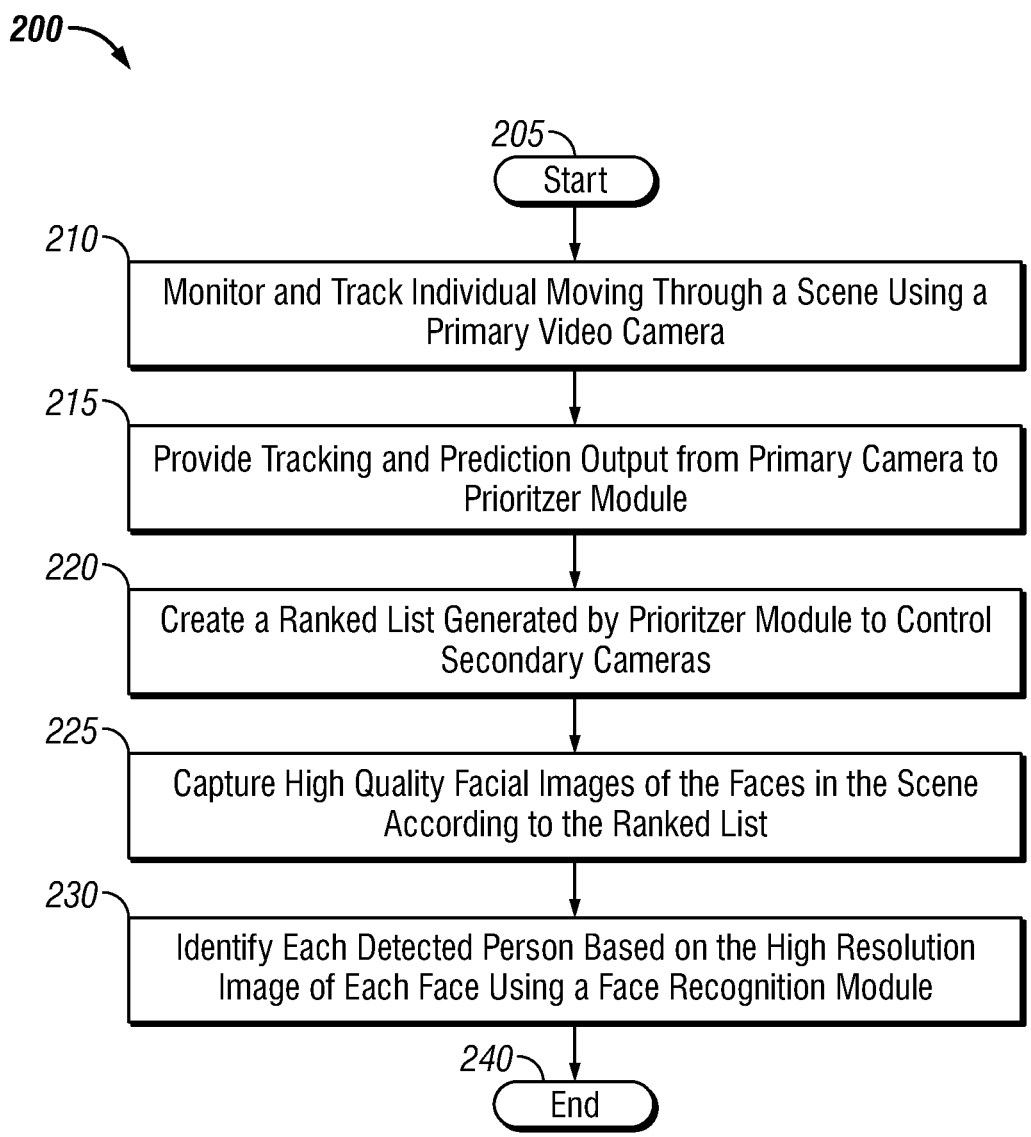
FIG. 2 illustrates a high level flow chart of a system and method for automatic face recognition.

FIG. 2 illustrates a high level flow chart of the automatic face recognition system and method 200, in accordance with an example embodiment. The method begins as illustrated at block 205. A primary video camera 105 can be then utilized to monitor a detection area 110 and track any individuals moving through a scene as illustrated at block 210. As shown at block 215, the primary video camera 105 can be then utilized to provide tracking and prediction output from the primary camera to the prioritizor module. In a preferred example embodiment the primary video camera can be equipped with a wide-angle capability.

At block 220 the data gathered by the primary video camera 105 is provided to a prioritizor module 130. The prioritizor module 130 then creates a prioritized list of the detected people and the prioritizor module 130 or a controller module 160 provides control commands to a plurality of secondary cameras 125 a-c as indicated by block 220.

High resolution images of the faces 145 of the people 120 present in the detection area 110 are then captured using a plurality of secondary video cameras 125 a-c according to the prioritized list provided by the prioritizor module 130 as depicted at block 225. The secondary video cameras 125 a-c are preferably equipped with a high-resolution capability and a pan, tilt, and zoom capability 150.

Finally, the images collected by the secondary video cameras 125 a-c are provided to a face recognition module 155 as depicted at block 230. The high resolution of these images allows the face recognition module 155 to provide an accurate identification of the individuals 120 present in the detection area 110. The method then ends as depicted at block 240.

Figure 3:
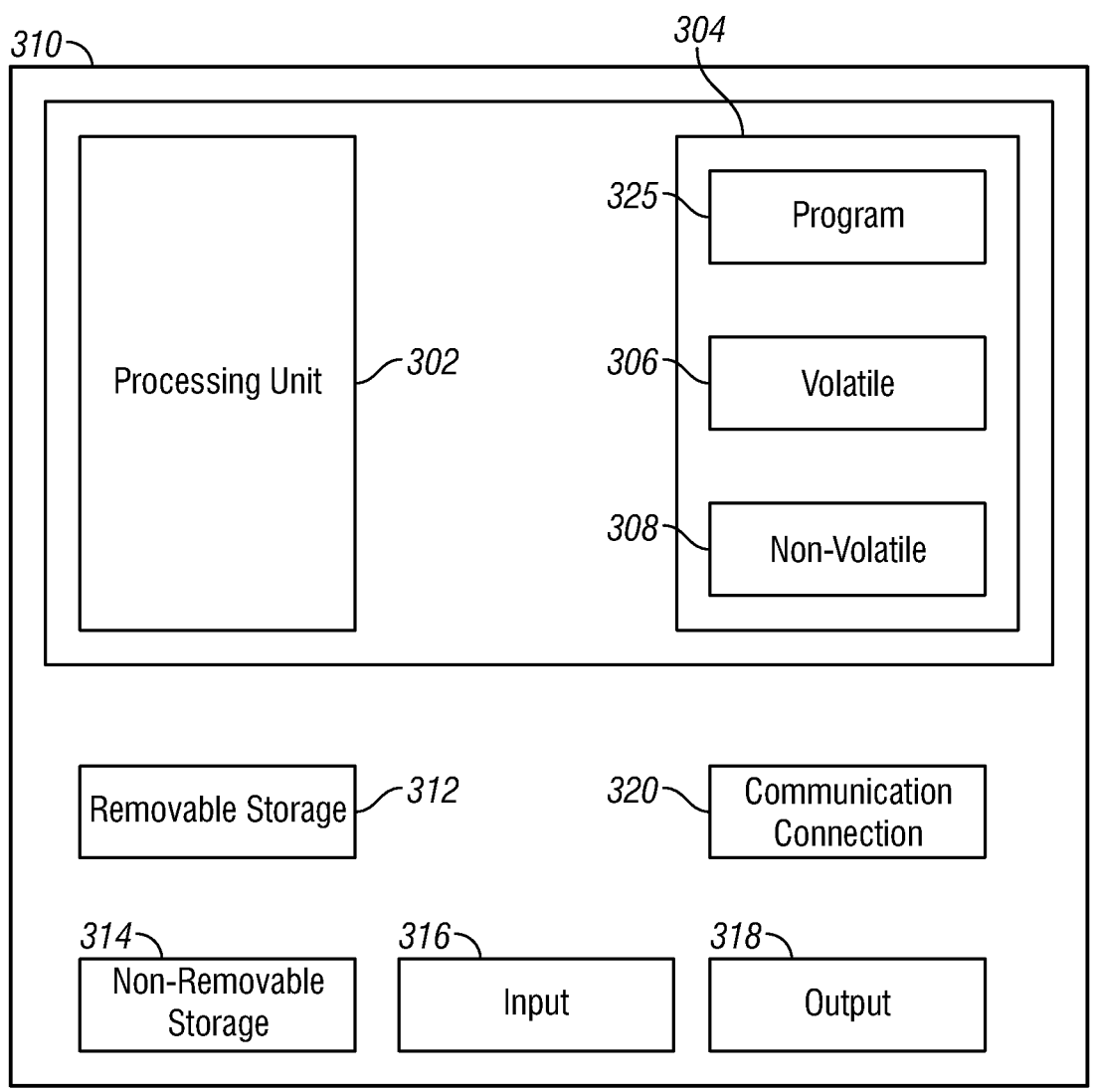
FIG. 3 is a block diagram of a typical computer system used to implement methods according to an example embodiment.

A block diagram of a computer system that executes programming for performing the above algorithms and methods is shown in FIG. 3. A general computing device in the form of a computer 310, may include a processing unit 302, memory 304, removable storage 312, and non-removable storage 314. Memory 304 may include volatile memory 306 and non-volatile memory 308. Computer 310 may include or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data, including video frames.

Computer 310 may include or have access to a computing environment that includes input 316, output 318, and a communication connection 320. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of computer 310. A hard drive, CD-ROM, and RAM are some examples of articles including a computer-readable medium.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for automatic face recognition at a distance, said method comprising:
    monitoring a scene for a presence of at least one individual using at least one primary camera;
    tracking said at least one individual moving through said scene using said at least one primary camera;
    providing tracking and prediction output data from said primary camera to a computer implemented prioritizor module, wherein said tracking and prediction output data is indicative of a predicted location of said at least one individual;
    compiling a ranked list of individuals comprising said at least one individual being tracked through said scene with said computer implemented prioritizor module according to a predefined set of location criteria comprising proximity to an exit and a subject count criteria comprising the number of individuals in said scene;
    controlling at least one secondary camera using a computer implemented controller module associated with said computer implemented prioritizor module by aiming said at least one secondary camera at each individual in said scene according to said ranked list provided by said computer implemented prioritizor module;
    capturing a plurality of high quality facial images of each face present in said scene using said at least one secondary cameras;
    identifying said at least one individual based on said plurality of high quality facial images using a computer implemented face recognition module; and
    utilizing a minimization of predicted error for a control of a pan, a tilt, and a zoom of said at least one secondary camera and said at least one primary camera, wherein said predicted error with respect to said an and said tilt is measured based on centering of a face of said at least one individual in at least one of said plurality of high resolution images and wherein said predicted error in said zoom is measured with a face size of said at least one individual in said at least one of said plurality of high resolution images.

2. The method of claim 1 further comprising configuring said at least one primary camera as a wide-angle camera configured with a wide angle lens and a digital pan, tilt, and zoom capability.

3. The method of claim 1 further comprising configuring said at least one secondary camera as a high-resolution camera having digital pan, tilt, and zoom features.

4. The method of claim 3 further comprising achieving said plurality of high quality facial images by pan, tilt, and zooming said at least one secondary camera according to a tracking and prediction output provided by said primary camera onto a targeted face with respect to said at least one individual.

5. The method of claim 1 further comprising:
    prioritizing data with respect to said scene utilizing overall scene information regarding said scene obtained from said at least one primary camera in association with target information obtained from said at least one secondary camera;
    constructing said ranked list of individuals based on said overall scene information and said target information; and
    interrupting and then continuing the step of obtaining said target information according to said overall scene information and target information from said at least one secondary camera.

6. The method of claim 5 further comprising employing a computer implemented controller module with respect to said at least one secondary camera for face detection, face tracking, and facial quality.

7. The method of claim 5 further comprising providing additional current target location information from said at least one primary camera to said computer implemented prioritizor module to update said ranked list.

8. A system for automatic face recognition at a distance, comprising:
    at least one primary camera for monitoring a scene for a presence of at least one individual;
    said at least one primary camera tracking said at least one individual moving through said scene;
    a computer implemented prioritizor module configured to provide tracking and prediction output data from said at least one primary camera, wherein said tracking and prediction output data is indicative of a predicted location of said at least one individual;
    a ranked list of individuals compiled by said computer implemented prioritizor module according to a predefined set of location criteria comprising proximity to an exit and a subject count criteria comprising the number of individuals in said scene, said ranked list of individuals comprising said at least one individual being tracked through said scene;

at least one secondary camera controlled by a computer implemented controller module associated with said computer implemented prioritizor module wherein said computer implemented prioritizor module aims each of said at least one secondary camera at each individual in said scene according to said ranked list;

wherein said secondary camera captures a plurality of high quality facial images of each face present in said scene;

a computer implemented face recognition module for identifying said at least one individual based on said plurality of high quality facial images; and wherein said computer implemented prioritizor module is configured to utilize a minimization of predicted error for a control of a pan, a tilt, and a zoom of said at least one secondary camera and said at least one primary camera, wherein said predicted error with respect to said an and said tilt is measured based on centering of a face of said at least one individual in at least one of said plurality of high resolution images and wherein said predicted error in said zoom is measured with a face size of said at least one individual in said at least one of said plurality of high resolution images.

9. The system of claim 8 wherein said at least one primary camera is configured as a wide-angle camera configured with a wide angle lens and a digital pan, tilt, and zoom capability.

10. The system of claim 8 wherein said at least one secondary camera is configured as a high-resolution camera having digital pan, tilt, and zoom features.

11. The system of claim 10 wherein said plurality of high quality facial images are captured by pan, tilt, and zooming said at least one secondary camera according to a tracking and prediction output provided by said primary camera onto a targeted face with respect to said at least one individual.

12. The system of claim 8 wherein said computer implemented prioritizor module is further configured to:

prioritize data with respect to said scene utilizing overall scene information regarding said scene obtained from said at least one primary camera in association with target information obtained from said at least one secondary camera;

construct said ranked list of individuals based on said overall scene information and said target information; and interrupt and then continue obtaining said target information according to said overall scene information and target information from said at least one secondary camera.

13. The system of claim 12 further comprising a computer implemented controller module adapted to control said at least one secondary camera for face detection, face tracking, and facial quality.

14. The system of claim 12 wherein said primary camera is configured to provide additional real time target location information to said computer implemented prioritizor module to update said ranked list while tracking a target.

15. A system for automatic face recognition at a distance, said system comprising:

at least one primary camera for monitoring a scene for a presence of at least one individual;

said at least one primary camera tracking said at least one individual moving through said scene wherein said primary camera is capable of capturing an image of each face presented in said scene;

a computer implemented prioritizor module configured to provide tracking and prediction output data from said at least one primary camera, wherein said tracking and prediction output data is indicative of a predicted location of said at least one individual;

a ranked list compiled by said computer implemented prioritizor module according to a predefined set of location criteria comprising proximity to an exit and a subject count criteria comprising the number of individuals in said scene, said ranked list of individuals comprising said at least one individual being tracked through said scene;

at least one secondary camera controlled by a computer implemented controller module associated with said computer implemented prioritizor module wherein said computer implemented prioritizor module aims each of said at least one secondary camera at each individual in said scene according to said ranked list wherein said secondary camera captures a plurality of high quality facial images of each face present in said scene;

a computer implemented face recognition module for identifying said at least one individual based on said plurality of high quality facial images; and wherein said computer implemented prioritizor module is configured to utilize a minimization of predicted error for a control of a pan, a tilt, and a zoom of said at least one secondary camera and said at least one primary camera, wherein said predicted error with respect to said an and said tilt is measured based on centering of a face of said at least one individual in at least one of said plurality of high resolution images and wherein said predicted error in said zoom is measured with a face size of said at least one individual in said at least one of said plurality of high resolution images.

16. The system of claim 15 wherein said primary camera is configured as a wide angle camera configured with a wide angel lens and a digital pan, tilt, and zoom capability and said secondary camera is configured as a high resolution camera with a digital pan, tilt, and zoom capability.

17. The system of claim 16 wherein said computer implemented prioritizor module is further configured to compile said ranked list using overall scene information from said primary camera and target information from said secondary camera, and wherein said computer implemented prioritizor module is configured to interrupt and then continue capture by said secondary camera according to said overall scene information and said target information.

* * * * *